(12) United States Patent
Robinson (10) Patent No.: US 9,170,962 B2
(45) Date of Patent: Oct. 27, 2015

(54) DYNAMIC DESIGNATION OF RETIREMENT ORDER IN OUT-OF-ORDER STORE QUEUE

(75) Inventor: Eric F. Robinson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1295 days.

(21) Appl. No.: 11/963,221

(22) Filed: Dec. 21, 2007

(65) Prior Publication Data

US 2009/0164734 A1    Jun. 25, 2009

(51) Int. Cl.
| G06F 9/30 | (2006.01) |
|---|---|
| G06F 9/40 | (2006.01) |
| G06F 15/00 | (2006.01) |
| G06F 13/16 | (2006.01) |

(52) U.S. Cl.
CPC .................. *G06F 13/1689* (2013.01)

(58) Field of Classification Search
USPC ........................................................ 712/218
See application file for complete search history.

(56) References Cited

U.S. PATENT DOCUMENTS

| 6,308,245 | B1 | 10/2001 | Johnson et al. |
|---|---|---|---|
| 6,378,124 | B1 | 4/2002 | Bates et al. |
| 6,481,251 | B1 | 11/2002 | Meier et al. |
| 6,834,058 | B1 | 12/2004 | Moyal et al. |
| 7,058,049 | B2 | 6/2006 | Tanaka et al. |
| 7,143,122 | B2 | 11/2006 | Burton et al. |
| 7,164,676 | B1 | 1/2007 | Chakraborty |
| 7,472,260 | B2 | 12/2008 | Lien et al. |
| 7,493,615 | B2 | 2/2009 | Gewirtz et al. |
| 7,500,087 | B2 | 3/2009 | Saha |
| 2002/0124042 | A1 | 9/2002 | Melamed et al. |
| 2004/0216125 | A1 | 10/2004 | Gazda et al. |
| 2005/0060413 | A1 | 3/2005 | Oyadomari et al. |
| 2006/0005110 | A1 | 1/2006 | Nango et al. |
| 2006/0085604 | A1 | 4/2006 | Guthrie et al. |
| 2006/0212868 | A1 | 9/2006 | Takayama et al. |
| 2009/0164729 | A1 | 6/2009 | Robinson |
| 2009/0164734 | A1 | 6/2009 | Robinson |

OTHER PUBLICATIONS

Gharachorloo et al.; Memory Consistency and Event Ordering in Scalable Shared-Memory Multiprocessors; 1990; IEEE; pp. 15-26.*
Faherty, C., Office Action dated May 20, 2010; U.S. Appl. No. 11/963,043.
Rajwar et al., 'Transactional Lock-Free Execution of Lock-Based Programs'; Oct. 2002; ASPLOS '02; pp. 5-17.
Faherty, C., Final Office Action dated Oct. 13, 2010; U.S. Appl. No. 11/963,043.

(Continued)

*Primary Examiner* — Corey S Faherty
(74) *Attorney, Agent, or Firm* — Yudell Isidore PLLC; Yuanmin Cai (57) ABSTRACT

A method, system and processing device for retiring data entries held within a store queue (STQ). The STQ of a processor cache is modified to receive and process several types of data entries including: non-synchronized (non-sync), thread of execution synchronized (thread-sync), and all thread of execution synchronized (all-thread-sync). The task of storing data entries, from the STQ out to memory or an input/output device, is modified to increase the effectiveness of the cache. The modified STQ allows non-sync, thread-sync, and all-thread-sync instructions to coexist in the STQ regardless of the thread of execution. Stored data entries, or stores are deterministically selected for retirement, according to the data entry type.

17 Claims, 6 Drawing Sheets

(56) References Cited

OTHER PUBLICATIONS

U.S. Appl. No. 11/963,043 entitled "Sync-ID for Multiple Concurrent Sync Dependencies in an Out-of-Order Store Queue"; Advisory action dated Jun. 30, 2014 (3 pg).

U.S. Appl. No. 11/963,043 entitled "Sync-ID for Multiple Concurrent Sync Dependencies in an Out-of-Order Store Queue"; Final office action dated Mar. 18, 2014 (5 pg).

U.S. Appl. No. 11/963,043 entitled "Sync-ID for Multiple Concurrent Sync Dependencies in an Out-of-Order Store Queue"; Non-Final office action dated Oct. 28, 2013 (6 pg).

U.S. Appl. No. 11/963,043 entitled "Sync-ID for Multiple Concurrent Sync Dependencies in an Out-of-Order Store Queue"; Notice of Allowance dated Aug. 28, 2014 (7 pg).

* cited by examiner

DYNAMIC DESIGNATION OF RETIREMENT ORDER IN OUT-OF-ORDER STORE QUEUE

CROSS-REFERENCE TO RELATED APPLICATIONS

The present application is related to the following co-pending U.S. patent application filed on even date herewith incorporated herein by reference in its entirety: Ser. No. 11/963,043 (RPS920070148US1), entitled "SYNC-ID FOR MULTIPLE CONCURRENT SYNC DEPENDENCIES IN AN OUT-OF-ORDER STORE QUEUE".

BACKGROUND

1. Technical Field

The present invention generally relates to processors and in particular to a technique for enhancing operations within a processor.

2. Description of the Related Art

A processor is a digital device that executes instructions specified by a computer program. A typical computer system includes a processor coupled to a system memory that stores program instructions and data to be processed by the program instructions. High level processor instruction execution may be broken down into three main tasks: (1) loading data into the upper level cache from memory or an input/output (I/O) device; (2) performing arithmetic operations on the data loaded from memory; and (3) storing the results out to memory or to an I/O device.

Of the three main tasks for processor instruction execution, storing, or writing the data to the memory (or I/O device) is the most flexible in regards to the latency of completing the task. Therefore, when there is a simultaneous request to access the upper level cache for loading and a request to access the upper level cache for storing, the loading operation is typically chosen to proceed prior to the storing operation. If multiple requests are made to load data, a request to store data to the cache may occur on consecutive processor execution cycles without success. The most common method of handling the occurrence of waiting to store data to the cache is to utilize a store queue (STQ). A STQ holds the data to be stored while waiting to access the cache.

Some STQs allow more recently processed data to write (or store) to the cache before data that has been waiting longer has been written to the cache. The process of younger data retiring (i.e. writing data into the cache) before older data retiring is known as out-of-order (OoO) operations. OoO STQs may introduce data integrity problems also known as store ordering hazards. For example, in a store ordering hazard, a younger data store to a given address may be retired prior to an older store to the same address. The data integrity problems resulting from the OoO STQ may result in a violation of the sequential execution model that is standard in processor architecture.

There are current methods of processing data stores to address the problems of OoO STQ, such as operations utilizing dependency vectors or synchronization identification (SID). Although dependency vectors are able to fully handle multiple synchronizing operations within an OoO STQ concurrently, use of these vectors does not scale well to larger (e.g. greater than sixteen entry) STQs. Although SID operations address the problem of processing synchronized entries from a particular thread, SID operations do not permit multiple all-thread synchronization operations to coexist simultaneously within a STQ. Dependency vectors and SIDs are effective in some aspects of STQ operations. However, the restrictions of SIDs decrease the efficiency of the processor instruction execution; thereby, decreasing the efficiency of the processor, and the lack of scalability when using dependency vectors in large STQs raises the area and power costs of the processor more than is desired.

SUMMARY OF ILLUSTRATIVE EMBODIMENTS

Disclosed are a method, system and process for retiring data entries held within a store queue (STQ). The STQ of a processor cache is modified to receive and process several types of data entries including: non-synchronized (non-sync), thread of execution synchronized (thread-sync), and all thread of execution synchronized (all-thread-sync). The task of storing data entries, from the STQ out to memory or an input/output device, is modified to increase the effectiveness of the cache. The modified STQ allows non-sync, thread-sync, and all-thread-sync instructions to coexist in the STQ regardless of the thread of execution. Stored data entries, or stores are deterministically selected for retirement, according to the data entry type.

In one embodiment, stores are selected for retirement from a STQ according to whether the data entry is a non-sync, thread-sync, or all-thread-sync data entry. Non-synchronized data entries retire out of order (OoO), and synchronized data entries retire in-order. Flags are utilized to manage data entry retirement for OoO verses in-order operations. Flags for managing the in-order verses OoO retirements are referred to as: thread-sync present ($TSP_{tid}$) bit, for controlling retirements per thread, and all-thread sync present (ASP), for controlling retirements per STQ.

In one embodiment, thread-sync data entries are present in the STQ. When a thread-sync data entry is present, the OoO STQ temporarily retires data entries sequentially, in order of the oldest to the youngest data entry. Stores within the STQ which are younger than the thread-sync data entry retire sequentially until each thread-sync data entry within a given thread of execution is retired. Data entries within the STQ that are older than the thread-sync data entry continue to follow an OoO process of retiring. Once the thread-sync data entry retires, the data processing operations return to an OoO process of retiring data entries, unless an all-thread-sync is present in the STQ.

In one embodiment, all-thread sync data entries are present in the STQ. When the all-thread-sync data entry is present, data entries younger than the all-thread-sync data entry retire sequentially. Data entries older than the all-thread-sync data entry retire utilizing OoO processing operations, or sequentially if the data entry involves a particular thread of execution that has a thread-sync present. When the all-thread-sync data entries retire, each thread independently returns to OoO operations unless the thread has thread-sync data entries in the STQ.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system, and process for retiring data entries held within a store queue (STQ). The STQ of a processor cache is modified to receive and process several types of data entries including: non-synchronized (non-sync), thread of execution synchronized (thread-sync), and all thread of execution synchronized (all-thread-sync). The task of storing data entries, from the STQ out to memory or an input/output device, is modified to increase the effectiveness of the cache. The modified STQ allows non-sync, thread-sync, and all-thread-sync instructions to coexist in the STQ regardless of the thread of execution. Stored data entries, or stores are deterministically selected for retirement, according to the data entry type.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term "store(s)" may be utilized to describe a data entry within the store queue. The terms "store" and "data entry" are utilized interchangeably. The following terms are utilized to describe the types of stores utilized herein: non-synchronized (non-sync), thread of execution synchronized (thread-sync), and all thread of execution synchronized (all-thread-sync). The term "retire" refers to writing a store from the STQ into a cache. "Allocate or allocated" is a term utilized herein, referring to the action of moving a new store that is entering the STQ into an available STQ entry. "Out of order (OoO)" describes the processing of stores within the STQ where a younger store is retired before an older store. The term "in-order" describes data entries processing in the order in which the store entered into the STQ (i.e. processed from the oldest data entry to the youngest data entry).

Figure 1:
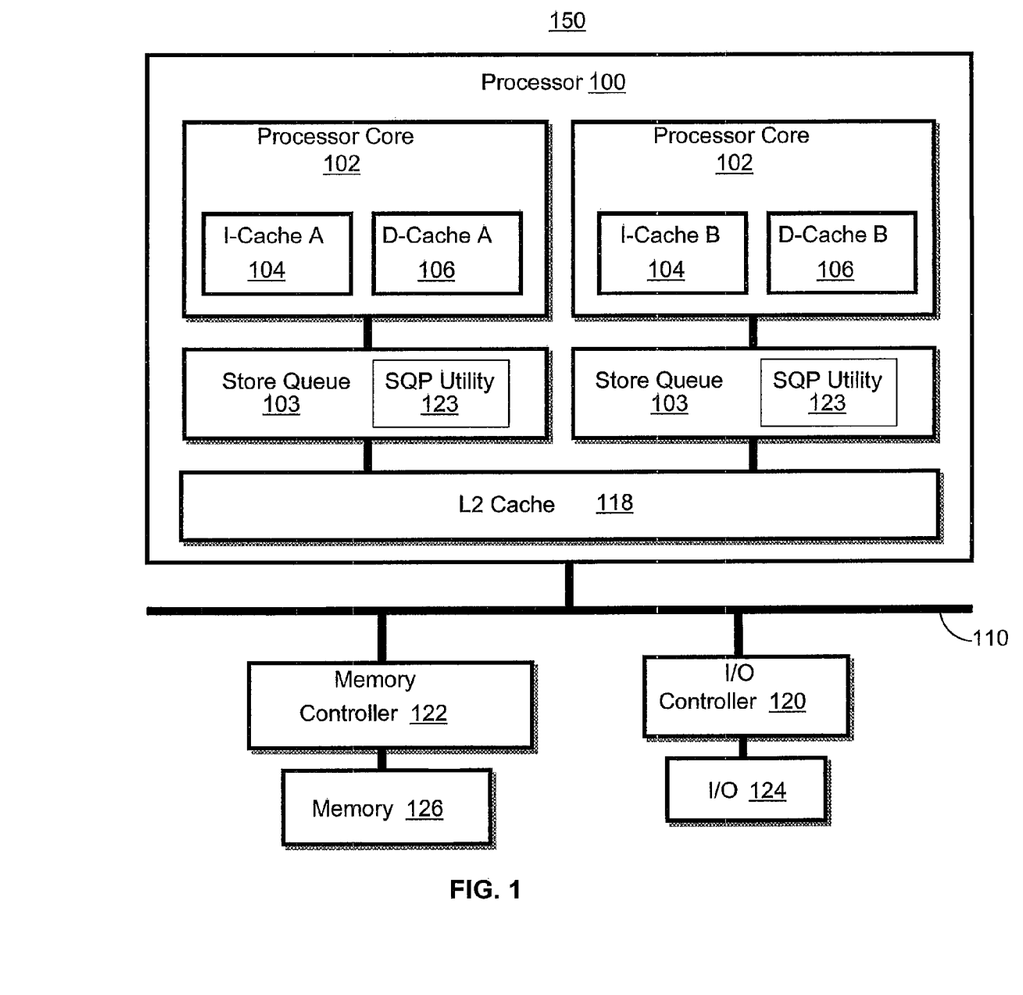
FIG. 1 is a block diagram of a multi-processor data processing system according to one embodiment of the invention.

With reference now to the figures, FIG. 1 depicts a block diagram representation of a multi-processor data processing system (DPS). DPS 150 comprises processor 100 having one or more processor cores 102. Processor cores 102 utilize instruction cache (I-cache) 104 as a buffer between external memory and processor cores 102. Data cache (D-cache) 106 of processor cores 102 receives data from memory 126. I-cache 104 and D-cache 106 are level 1 (L1) caches that share level 2 (L2) cache 118. I-cache 104 and D-cache 106 are coupled to L2 cache 118, which operates as a memory cache external to the processor core. Store queue 103 comprises store queue processing (SQP) utility (or logic) 123. Store queue 103 processes store requests from processor 100.

Processor 100 is connected to memory controller 122 and I/O controller 120 via interconnect (system bus) 110 by which processor 100 communicates with memory 126, I/O devices 124, and other peripheral devices. Interconnect 110 may be a bifurcated bus with a data bus for routing data and a separate address bus for routing address transactions and other operations. Processor 100 communicates with main memory 126 via L2 cache 118 which is coupled to memory controller 122 via system interconnect 110. Memory controller 122 may be configured to manage the transfer of data between L2 cache 118 and main memory 126. Processor 100 may also include a level 3 (L3) directory (not illustrated). The L3 directory may be on or off chip with access to an off chip L3 cache. While the present invention is described with specific reference to the L2 cache in communication with store queue (STQ) 103 within a multi-level cache architecture, the cache architecture need not be a multi-level one.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The processor chip depicted in FIG. 1 may be, for example, an IBM Power processor, a product of International Business Machines Corporation in Armonk, N.Y.

Among the code/instructions/logic provided by SQP utility 123, and which are specific to the invention, are: (a) code/logic for processing non-sync stores within STQ 103; (b) code/logic for processing thread-sync stores within the STQ 103; and (c) code/logic for processing all-thread-sync stores within the STQ 103. For simplicity of the description, the collective body of code/logic that enables these various features is referred to herein as SQP utility 123. According to the illustrative embodiment, various features of the invention are carried out by logic components on processor 100 and SQP utility 123. SQP utility 123 initiates a series of functional processes that enable the above functional features as well as additional features/functionality, which are described below within the description of FIGS. 2-6.

Figure 2:
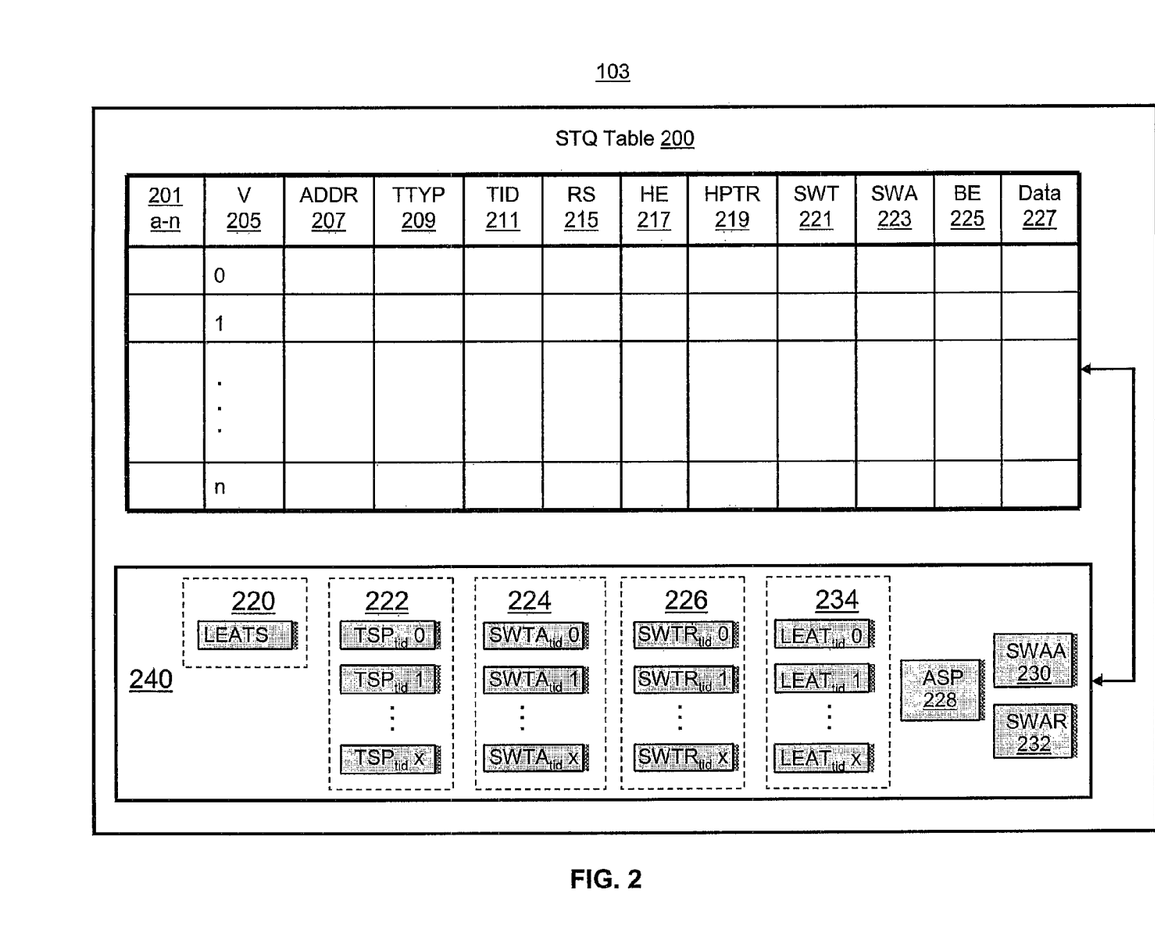
FIG. 2 is a block diagram representing components of a STQ utilized to complete data entry processing operations, in accordance with one embodiment of the invention.

With reference now to FIG. 2, which illustrates the major functional components of STQ 103 utilized to complete data store operations. STQ 103 comprises STQ table 200 and bit manager 240. STQ 103 is utilized for tracking data stores issued by processor 100. STQ table 200 is partitioned into several input categories: entry 201(a-n), valid bit 205, address register 207, transaction type (ttyp) register 209, thread identification (TID) 211, recent store (RS) 215, hazard exists (HE) 217, hazard pointer (HPTR) 219, thread-sync wrap bit (SWT) 221, all-thread-sync wrap bit (SWA) 223, byte enable register 225, and data register 227.

Entry 201a-n is the input of the processor issued stores. STQ table 200 sends and receives information to and from bit manager 240. Bit manager 240 comprises last entry allocated (LEATS, also referred to as LEATS pointer) 220, last entry allocated for each thread (LEAT$_{tid}$, also referred to as LEAT$_{tid}$ pointer) 234, thread-sync present thread identification (TSP$_{tid}$) 222, thread-sync wrap bit for allocation per thread identification (SWTA$_{tid}$) 224, thread-sync wrap bit for retirement per thread identification (SWTR$_{tid}$) 226, all-thread-sync present (ASP) 228, all-thread-sync wrap bit for allocation (SWAA) 230, and all-thread-sync wrap bit for retirement 232. LEAT$_{tid}$ 234, TSP$_{tid}$ 222, SWTA$_{tid}$ 224, and SWTR$_{tid}$ 226 include an input for each thread of execution (e.g. 0 to x, where '0' is the initial thread of execution and 'x' is the final thread of execution) being processed.

In one embodiment, elements within STQ table 200 represent hardware components utilized to complete the operations of STQ 103. Flags for controlling in-order operations verses OoO operations are described by TSP$_{tid}$ 222 and ASP 228. TSP$_{tid}$ 222 controls in-order processing operations for each thread of execution, and ASP 228 controls in-order operations for all threads of execution. LEATS 220 and LEAT$_{tid}$ 234 are pointers utilized for managing in-order operations. LEAT$_{tid}$ 234 manages in-order operations per thread of execution, while LEATS 220 manages in-order operations for all threads of execution.

In one embodiment, the synchronized wrap bits of SWTA$_{tid}$ 224, SWTR$_{tid}$ 226, SWAA 230, SWAR 232, SWT 221, and SWA 223 are flags for managing which OoO entry may retire before the first synchronized data entry may retire from STQ 103. SWTA$_{tid}$ 224 and SWTR$_{tid}$ 226 are flags which manage the OoO data entries per thread, while SWAA 230 and SWAR 232 are shared by all threads. Flags for managing OoO operations per data entry are SWT 221 and SWA 223.

In one embodiment, for each synchronized process, if the bit of TSP$_{tid}$ 222 is equal to zero when a thread-sync store for a given thread enters STQ 103, then SWTA$_{tid}$ 224 is inverted (i.e. a bit equal to one becomes zero, and a bit equal to zero becomes one) and TSP$_{tid}$ 222 is set to one. If no valid entries for a particular thread within STQ 103 have SWT 221 equal to SWTR$_{tid}$ 226, then the bit of SWTR$_{tid}$ 226 is inverted. When the bit of SWTR$_{tid}$ 226 is inverted, the store which forced the bit of SWTA$_{tid}$ 224 to be inverted may retire. When an all-thread-sync store enters STQ 103, if ASP 228 is equal to zero, then the bit of SWAA 230 is inverted and ASP 228 is set to one. If no valid entries exist having their SWA 223 equal to the bit of SWAR 232, then SWAR 232 is inverted; thereby allowing the all-thread sync store which caused SWAA 230 to be inverted to retire.

In one embodiment, STQ 103 may process a "normal store". A normal store may be a data entry present in STQ table 200 that is a non-sync, non-thread-sync, and non-all-thread-sync store. When the bit for TSP$_{tid}$ 222 and ASP 228 are both equal to zero, the data entry is processed as a normal store. Normal stores retire utilizing out-of-order (OoO) processing. OoO processing may retire stores youngest to oldest, unless the youngest store possesses the same address as an older store that has not retired. When a younger store and older store are assigned to the same address, the younger store is assigned HE 217 bit equal to one, which tracks when the older store retires. After the older store retires, the younger store is free to retire. The new bit entry for RS 215 is set equal to one to confirm the presence of the youngest STQ entry for that address, while the bit for RS 215 of older matching stores, are cleared. Therefore, only stores with a bit for RS 215 equal to one are compared. HE 217 is set equal to one if a store ordering hazard exists. The bits of HPTR 219 are an encoded value of the STQ entry (entry 201a-n) that points to the entry that must retire before the most recent entry is allowed to proceed.

In one embodiment, a normal store may be processed when one or more thread-sync stores are present in STQ table 200. When a thread-sync store is present in STQ table 200, but no all-thread-sync stores is present, the bit of TSP$_{tid}$ 222 is equal to one and the bit of ASP 228 is equal to zero. The new bit entry for RS 215 is set equal to one to confirm the presence of the youngest STQ entry for that address, while the bit for RS 215 of older matching stores, are cleared. The bits of HPTR 219 are set equal to the bits of LEAT$_{tid}$ 234. LEAT$_{tid}$ 234 helps to manage in-order operations, by pointing to the last entry allocated for each thread of execution operating within STQ 103. LEAT$_{tid}$ pointer 234 is updated, pointing to the newly allocating entry for the entry's thread of execution operating within STQ 103. LEATS pointer 220 is updated, pointing to the newly allocating entry within STQ 103. The bits of SWTA$_{tid}$ 224 and SWAA 230 are saved without being changed into bits SWT 221 and SWA 223, respectively, of the newly allocating STQ entry.

In one embodiment, a normal store may be processed when one or more all-thread-sync stores are present in STQ table 200. When an all-thread-sync store is present in STQ table 200, the bit of ASP 228 is equal to one. The new bit entry for RS 215 is set equal to one to confirm the presence of the youngest STQ entry for that address, while older bit entries for RS 215 of older matching stores, are cleared. The bit of HE pointer 217 is set equal to one because a store order hazard exists. The bits of HPTR 219 are set equal to the bits of LEATS 220. LEAT$_{tid}$ pointer 234 is updated, pointing to the newly allocating STQ entry for its thread of execution operating within STQ 103. LEATS pointer 220 is updated, pointing to the last entry allocated within STQ 103. The bits of SWTA$_{tid}$ 224 and SWAA 230 remain unchanged and are saved into bits SWT 221 and SWA 223, respectively.

In another embodiment, a thread-sync store is processed when no synchronized stores are present in STQ table 200. When there are no synchronized stores present in STQ table 200, the bits of TSP$_{tid}$ 222 and ASP 228 are equal to zero. If a thread-sync store is processed with no other synchronized stores present (non-sync entries may be present), the bit of SWTA$_{tid}$ 224 is inverted and saved into bit SWT 221 of the newly allocating STQ entry and the bit of SWAA 230 is saved into the bit of SWA 223 of the newly allocating STQ entry. The bits of LEAT$_{tid}$ 234 and LEATS 220 are updated, pointing to the newly allocating entry withing STQ 103. Older bit entries for RS 215 of all older stores for that thread are cleared. The bit of TSP$_{tid}$ 222 is set equal to one, confirming a thread-sync store is present in STQ table 200. Data entries allocated to the STQ 200 when the bit of TSP$_{tid}$ 222 is set equal to one, will process in-order.

In one embodiment, a thread-sync entry is processed when one or more thread-sync entries and no all-thread-sync entries are present in STQ table 200. When a thread-sync entry is present in STQ table 200, the bit of TSP$_{tid}$ 222 is equal to one, and when no all-thread-sync entry is present in STQ table 200, the bit of ASP 228 is equal to zero. HE pointer 217 is set equal to one to confirm a store hazard exists. The bits of HPTR 219 are set equal to the bits of LEAT$_{tid}$ pointer 234.

LEAT$_{tid}$ pointer 234 is updated, pointing to the newly allocating STQ entry for the entry's thread of execution operating within STQ 103. LEATS pointer 220 is updated, pointing to the last entry allocated within STQ 103. The bits of SWTA$_{tid}$ 224 and SWAA 230 remain unchanged and are saved into bits SWT 221 and SWA 223.

In one embodiment, a thread-sync store is processed when one or more all-thread-sync stores are present in STQ table 200. When an all-thread-sync store is present in STQ table 200, the bit of ASP 228 is equal to one. The new bit entry for RS 215 is set equal to one to confirm the presence of an all-thread-sync store, while bit entries for RS 215 of all previous stores, are cleared. The bit of HE 217 is set equal to one to confirm a store hazard exists. The bits of HPTR 219 are set equal to the bits of LEATS 220. LEAT$_{tid}$ pointer 234 is updated, pointing to the newly allocating STQ entry for its thread of execution operating within STQ 103. LEATS pointer 220 is updated, pointing to the last entry allocated within STQ 103. SWTA$_{tid}$ 224 and SWAA 230 bits remain unchanged and are saved into bits SWT 221 and SWA 223, respectively.

In another embodiment, an all-thread-sync store is processed when no synchronized stores are present in STQ table 200. When there are no synchronized stores present in STQ table 200, the bits of TSP$_{tid}$ 222 and ASP 228 are equal to zero. The bit of SWAA 230 is inverted and saved into bit SWA 223 of the newly allocating STQ entry. LEAT$_{tid}$ pointer 234 is updated, pointing to the newly allocating STQ entry for its thread of execution operating within STQ 103. LEATS pointer 220 is updated, pointing to the last entry allocated within STQ 103. The bit of ASP 228 is set equal to one. Older bit entries for RS 215 of all older stores for all threads are cleared.

In one embodiment, an all-thread-sync store is processed when one or more thread-sync stores are present in STQ table 200. When an all-thread-sync store is present in STQ table 200, the bit of TSP$_{tid}$ 222 is equal to one, and the bit of ASP 228 is equal to zero. The new bit entry for RS 215 of the current store is set equal to one to confirm the presence of a thread-sync store, while bits for RS 215 of all older stores, are cleared. The bits of LEATS 220 are updated. The bits of LEAT$_{tid}$ 234 are updated, pointing to the last entry allocated for each thread of execution operating within STQ 103; wherein updating comprises changing the binary bits of LEAT$_{tid}$ 234 and LEATS 220 to match the entry allocated by the STQ. The bit of SWAA 230 is inverted and saved into bit SWA 223. The bit of ASP 228 is set equal to one.

In one embodiment, an all-thread-sync store is processed when one or more all-thread-sync stores are present in STQ table 200. When an all-thread-sync store is present in STQ table 200, the bit of ASP 228 is equal to one. The new bit entry for RS 215 is set equal to one to confirm the presence of an all-thread-sync store, while older bit entries for RS 215 of previous stores, are cleared. The bit of HE 217 is set equal to one to confirm a store hazard exists. The bits of HPTR 219 are set equal to the bits of LEATS 220. The bits of LEATS 220 are updated. The bits of LEAT$_{tid}$ 234 are updated, pointing to the last entry allocated for each thread of execution operating within STQ 103. The bit of SWAA 230 remains unchanged, and is saved into bit SWA 223.

Figure 3:
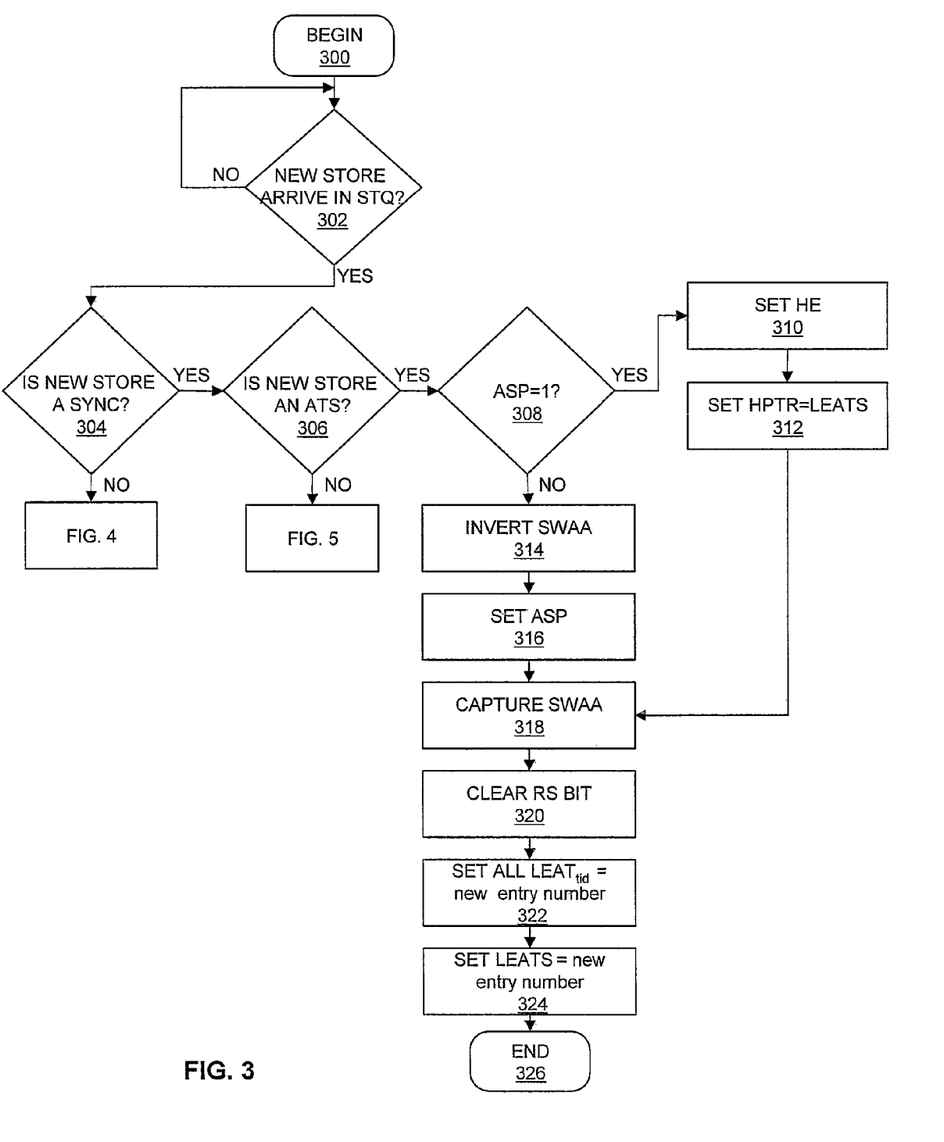
FIG. 3 is a logic flow chart for allocating all-thread synchronized data entries within a STQ, according to one embodiment of the invention.
Figure 4:
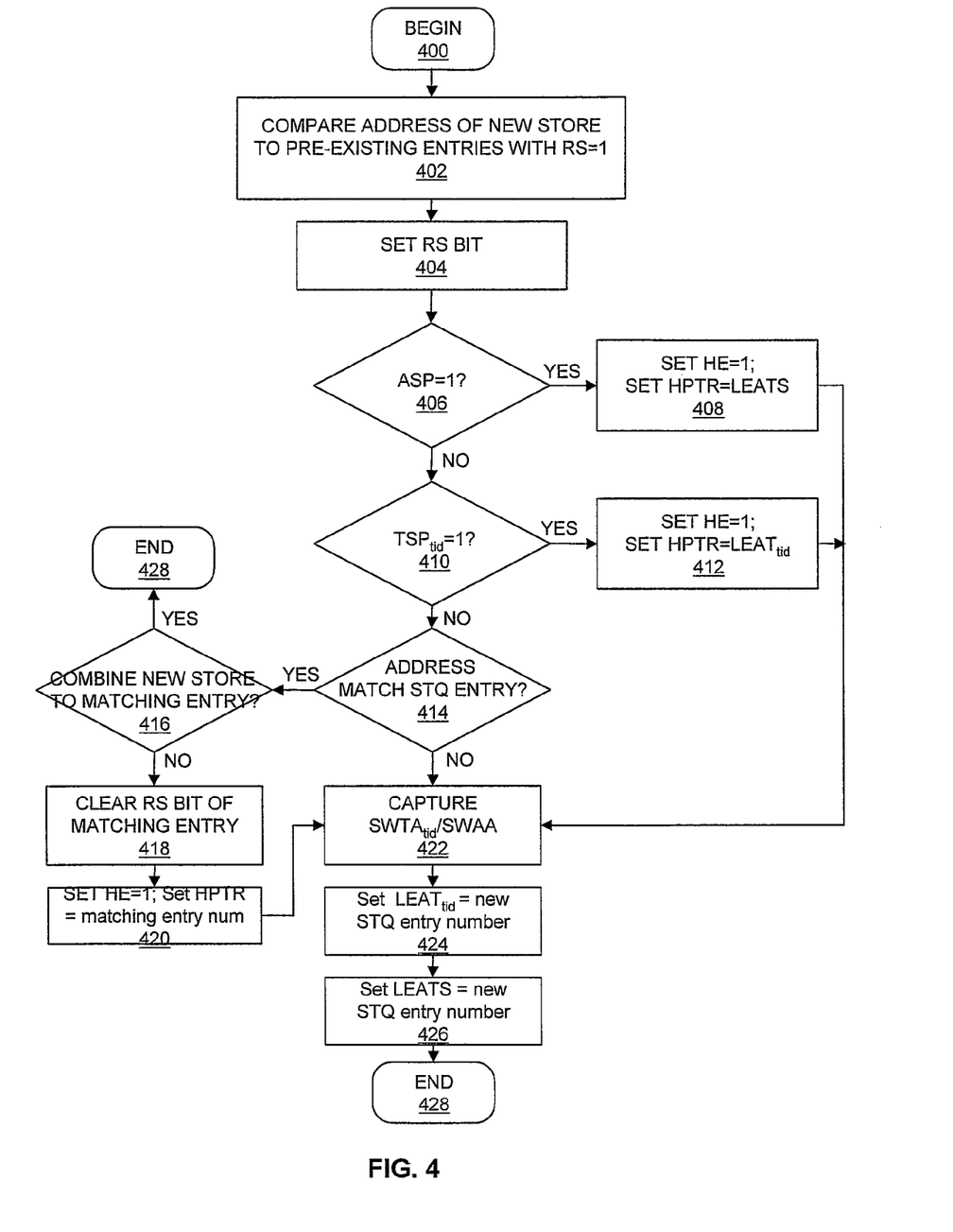
FIG. 4 is a logic flow chart for allocating non-synchronized data entries within a STQ, in accordance with one embodiment of the invention.
Figure 5:
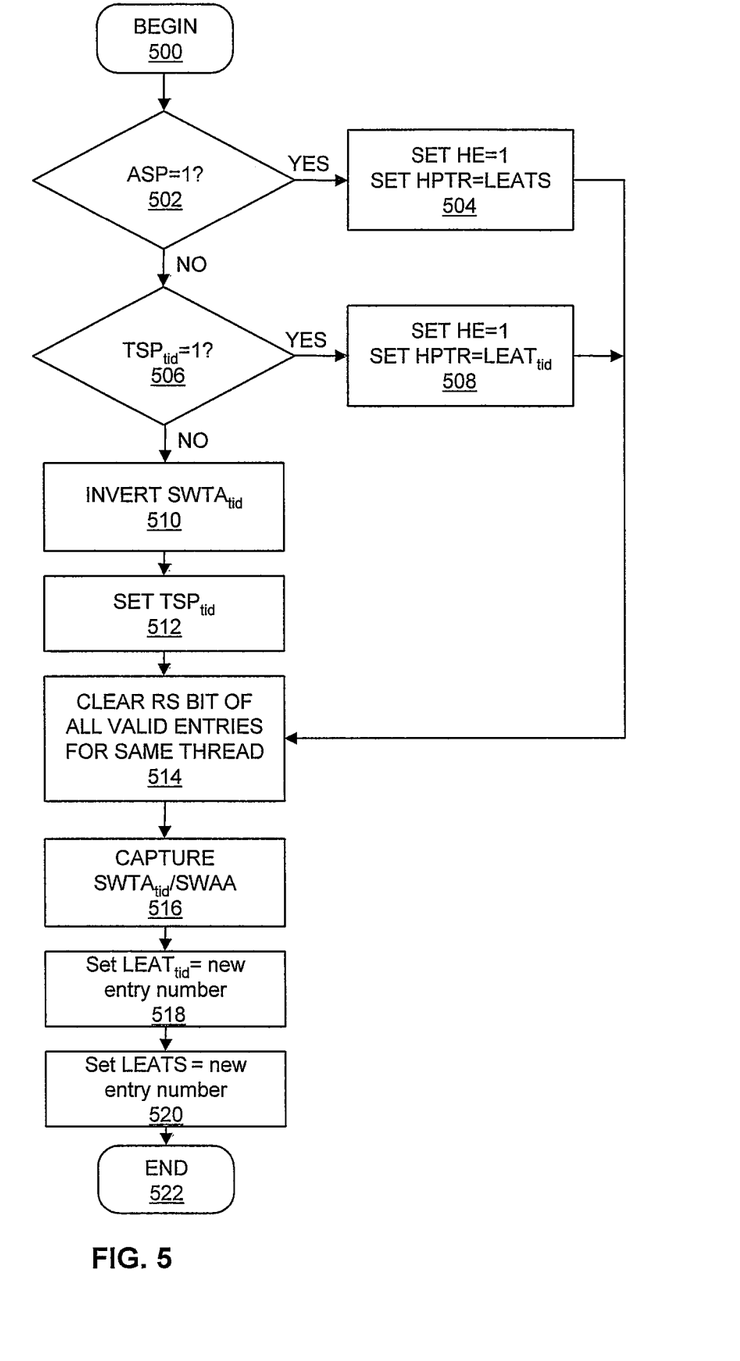
FIG. 5 is a logic flow chart for allocating thread-synchronized data entries within a STQ, according to one embodiment of the invention.

FIGS. 3-6 are flow charts illustrating various methods by which the above processes of the illustrative embodiments are completed. Although the methods illustrated in FIGS. 3-6 may be described with reference to components shown in FIGS. 1-2, it should be understood that this is merely for convenience and alternative components and/or configurations thereof can be employed when implementing the various methods. FIG. 3 describes the method for allocating all-thread-sync stores within STQ 103 (FIG. 1). The method for allocating non-sync stores is described by FIG. 4. FIG. 5 describes the method for allocating thread-sync stores. The method for determining the eligibility for retirement of a store from the STQ (103) is described in FIG. 6. Key portions of the methods may be completed by SQP utility 123 of STQ 103. The methods are thus described from the perspective of SQP utility 123.

The process of FIG. 3 begins at initiator block 300 and proceeds to block 302, at which a decision is made whether a new store has arrived in the STQ. If a new store has arrived in the STQ, the process continues to block 304. If a new store has not arrived, the process remains at block 302 until a new store arrives in the STQ. At block 304, a decision is made whether the new store is a synchronized store. If the new store is not a synchronized store, the process continues to FIG. 4. If the new store is a synchronized store the process continues to block 306. At block 306, a decision is made whether the new store is an all-thread-synchronized (ATS) store. If the new store is not an ATS store the process continues to FIG. 5. If the new store is an ATS store, the process continues to block 308. A decision is made at block 308, whether the all-thread sync present (ASP) bit, within the bit manager (240) of the STQ, is equal to one. If ASP is equal to one, the process continues to block 310 where the hazard exist (HE) bit is set equal to one, acknowledging that a hazard exists in the STQ. At block 312, the bits of HPTR are set equal to the bits of LEATS; thereby pointing to the last entry allocated by the STQ. The process continues to block 318.

If ASP is not equal one at block 308, the process continues to block 314. At block 314, the all-thread-sync wrap bit for allocation (SWAA) is inverted. SQP utility 123 sets the all-thread-sync present (ASP) bit to one, at block 316, to verify the all-thread-sync is present. At block 318, the current value of the SWAA bit is captured (or saved) by SQP utility 123. The recent store (RS) bit, for the current store and for all pre-existing stores in the STQ, is cleared at block 320. At block 322, the last entry allocated pointer per thread (LEAT$_{tid}$) is updated to point to the newly allocating entry. The last entry allocated pointer for the STQ (LEATS) is updated at block 324 to point to the newly allocating entry. The process ends at block 326.

The process of FIG. 4 is a continuation of FIG. 3, wherein a decision is made at block 304 that the new store is a non-synchronized (non-sync) store. The process of FIG. 4 begins at block 400. At block 402 an assessment is made comparing the new store target address to the address of pre-existing stores that have an RS bit equal to one. The RS bit is set equal to one at block 404. A decision is made by SQP utility 123, at block 406, whether the ASP bit of the new store is equal to one. If the ASP bit is equal to one, the process continues to block 408. At block 408 the HE bit for the new store is set to one and the bits of HPTR are set equal to the bits of LEATS. The process continues to block 422.

If the ASP bit of the new store is not equal to one, a decision is made at block 410, whether the thread-sync present per thread (TSP$_{tid}$) bit is equal to one. If the TSP$_{tid}$ bit is equal to one at block 410, the process continues to block 412. At block 412 the HE bit for the new store is set to one and the bits of HPTR are set equal to the bits of LEAT$_{tid}$. The process continues to block 422. If at block 410 the TSP$_{tid}$ is not equal to one, the process continues to block 414. A decision is made at block 414 whether in block 402 the target address of the new store matched the address of another store within STQ table 200 (FIG. 2). If the address of the new store matches the address of another entry, the process continues to block 416.

If the target address of the new store does not match the address of another entry within STQ table 200, then the process continues to block 422.

At block 416 a decision is made whether the new store is going to be gathered (or combined) with an older store to the same address or whether the new store will be allocated to a new STQ entry. If a new entry is not allocated, then the store is being combined with a pre-existing entry. Thus, the new store would not clear the RS bit of the matching entry (that the new store is gathering to), and the new store would also not set the HE bit of the entry that the new store is gathering to. If a new store is not allocated, the process ends at block 428. If a new store is allocated, the process continues to block 418. At block 418 the RS bits are cleared for the matching address entry. At block 420, the HE bit of the new store is set to one, identifying a hazard exists, and the HPTR is set equal to the matching entry number (pointing to the new entry). The process proceeds to block 422. At block 422, the bits of $SWTA_{tid}$ and SWAA are captured (i.e. saved) by SQP utility 123. The bits of $LEAT_{tid}$ are updated to point to the entry allocated by the STQ utility at block 424. At block 426, the bits of LEATS are updated to point to the entry allocated by the STQ utility. The process ends at block 428.

The process of FIG. 5 is initiated when the determination is made (at block 306 of FIG. 3) that the new store was not a non-sync store or an all-thread-sync store; and thus, the store is a thread-sync store. The process begins at block 500. At block 502, a decision is made whether the bit of ASP is equal to one. If the bit of ASP is equal to one the process continues to block 504 where the HE bit is set to one, and the bits of HPTR are set equal to the bits of LEATS. The process then proceeds to block 514. If the bit of ASP is not equal to one, the process continues to block 506. At block 506 a determination is made. If the bit of $TSP_{tid}$ is equal to one, the process continues to block 508. If the bit of $TSP_{tid}$ is not equal to one, the process continues to block 510. The HE bit is set equal to one and HPTR is set equal to $LEAT_{tid}$, at block 508. At block 510, the bit of $SWTA_{tid}$ is inverted. The bit of $TSP_{tid}$ is set to one, at block 512. At block 514, the RS bit for each pre-existing data entry is cleared, within the current thread. The bits of $SWTA_{tid}$ and SWAA are captured, at block 516. The bits of $LEAT_{tid}$ are updated at block 518 to point to the newly allocating entry. At block 520, the bits of LEATS are updated to point to the newly allocating entry. The process ends at block 522

Figure 6:
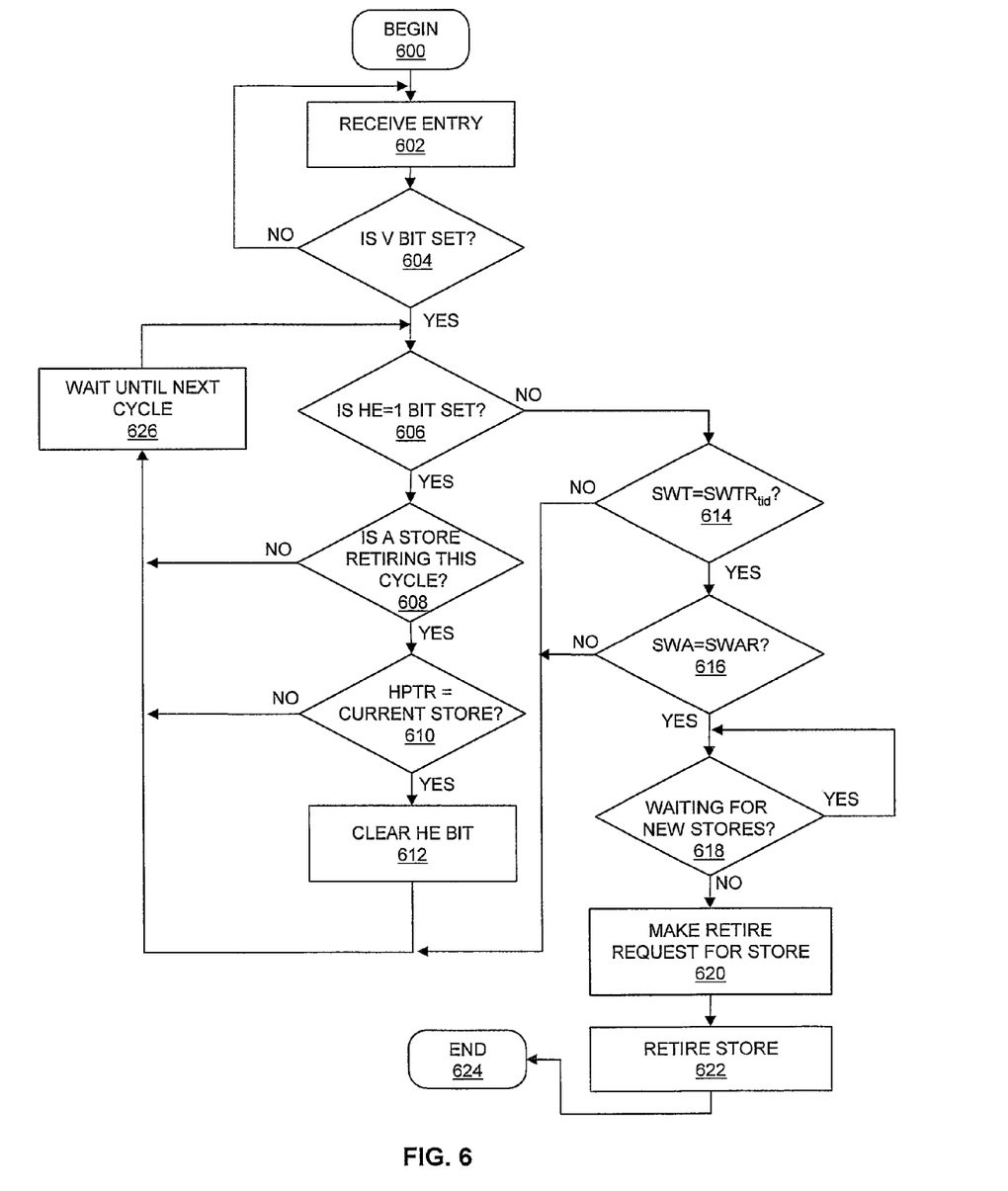
FIG. 6 is a logic flow chart for determining eligibility for retirement of data entries within an STQ, in accordance with one embodiment of the invention.

The process for determining whether a store is eligible to retire is illustrated by FIG. 6. The process begins at block 600 and continues to block 602. At block 602 an entry is received in the STQ. A decision is made, at block 604, whether the valid (V) bit is set, wherein the valid bit confirms the store is a legitimate STQ entry. If the V bit is not set the process returns to block 602. If the V bit is set, the process continues to block 606. A decision is made at block 606 whether the HE bit is set. If the HE bit is not set, the process continues to block 614. If the HE bit is set the process continues to block 608. At block 608, a decision is made whether a store is set to retire during the current cycle. If a store is set to retire, the process continues to block 610. If a store is not set to retire, the process continues to block 626, wherein the data entry waits for the next cycle to be processed.

A decision is made at block 610, whether the encoded value of the HPTR equals the encoded value of the current store. If the encoded value of the HPTR is not equal to the encoded value of the current store, the process continues to block 626, where the entry waits for the next cycle to be processed. If the encoded value of the HPTR is equal to the encoded value of the current cycle, then the HE bit is cleared at block 612. The process proceeds to block 626 where the entry waits for the next cycle to be processed.

At block 614 a decision is made whether the bit of SWT is equal to the bit of $SWTR_{tid}$. If the bit of SWT equals the bit of $SWTR_{tid}$, the process continues to block 616. If the bits are not equal, the process continues to block 626, where the entry waits until the next cycle is processed. A decision is made at block 616 whether the bit of SWA is equal to the bit of SWAR. If the bits of the SWA are equal to the bits of SWAR, the process continues to block 618. If the bit of SWA is not equal to the bit of SWAR, the process proceeds to block 626 to wait for the next cycle to be processed. At block 618, a decision is made whether the SQP utility is waiting for new stores to combine with the STQ entry. If the SQP utility is waiting for new stores to combine with the STQ entry, the process remains at block 618. If the SQP utility is not waiting for new stores to combine with the STQ entry, the process continues to block 620. At block 620, a request to retire the current store is made. The store is retired at block 622. The process ends at block 624. In some implementations, the STQ requires several cycles before the retirement request is honored, therefore the STQ entry waits until the STQ receives permission to retire the STQ entry.

In the flow charts above, one or more of the methods are embodied as a computer program product in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
   receiving a non-synchronized store into a store queue (STQ);
   in response to receiving the non-synchronized store in the STQ, setting or clearing one or more flags;
   in response to receiving the non-synchronized store in the STQ, dynamically designating using the flags the non-synchronized store to retire in-order if an older synchronized store is already present in the STQ and, if an older synchronized store is not already presented in the STQ, dynamically designating using the flags the non-synchronized store to retire out-of-order; and
   retiring the non-synchronized store in accordance with its dynamically designated retirement ordering, said retiring including retiring the non-synchronized store in-order after the synchronized store retires if the non-synchronized store is designated to retire in-order and otherwise retiring the non-synchronized store without enforcing in-order retirement.

2. The method of claim 1, wherein said retiring further comprises retiring the non-synchronized store out-of-order if the non-synchronized store is designated to retire out-of-order.

3. The method of claim 1, wherein the retiring further comprises:
   if at least one synchronized store is present in the STQ that is younger than the non-synchronized store, permitting retirement of the non-synchronized store out-of-order and enforcing retirement of the non-synchronized store before the at least one synchronized store retires.

4. The method of claim 1, wherein the dynamically designating further comprises:
   determining whether the non-synchronized store targets an address that is targeted by a preceding non-synchronized store present within the STQ, and if so, dynamically designating the non-synchronized store to retire in-order.

5. The method of claim 1, wherein if an older thread-synchronized store is already present in the STQ when the non-synchronized store is received at the STQ, the method further comprises:
   retiring the thread-synchronized store in-order, prior to the retirement of the non-synchronized store.

6. The method of claim 1, wherein if an all-thread synchronized store is present in STQ when the non-synchronized store is received at the STQ, the method further comprises:
   permitting retirement of non-synchronized stores older than the all-thread synchronized store out-of-order and enforcing in-order retirement of synchronized stores older than the all-thread synchronized store.

7. A processor chip comprising:
   a processor core;
   a store queue (STQ) coupled to the processor core; and
   logic associated with the STQ, which logic performs the functions of:
      receiving a non-synchronized store into a store queue (STQ);
      in response to receiving the non-synchronized store in the STQ, setting or clearing one or more flags;
      in response to receiving the non-synchronized store in the STQ, dynamically designating using the flags the non-synchronized store to retire in-order if an older synchronized store is already present in the STQ and, if an older synchronized store is not already presented in the STQ, dynamically designating using the flags the non-synchronized store to retire out-of-order; and
      retiring the non-synchronized store in accordance with its dynamically designated retirement ordering, said retiring including retiring the non-synchronized store in-order after the synchronized store retires if the non-synchronized store is designated to retire in-order and otherwise retiring the non-synchronized store without enforcing in-order retirement.

8. The processor chip of claim 7, wherein said logic retires the non-synchronized store out-of-order if the non-synchronized store is designated to retire out-of-order.

9. The processor chip of claim 7, wherein the logic, if at least one synchronized store is present in the STQ that is younger than the non-synchronized store, permits retirement of the non-synchronized store out-of-order and enforces retirement of the non-synchronized store before the at least one synchronized store retires.

10. The processor chip of claim 7, wherein if an older thread-synchronized store is already present in the STQ when the non-synchronized store is received at the STQ, the logic retires the thread-synchronized store in-order, prior to the retirement of the non-synchronized store.

11. The processor chip of claim 7, wherein if an all-thread synchronized store is present in STQ when the non-synchronized store is received at the STQ, the logic permits retirement of non-synchronized stores older than the all-thread synchronized store out-of-order and enforces in-order retirement of synchronized stores older than the all-thread synchronized store.

12. A data processing system comprising:
   a memory hierarchy, including a lower level cache;
   a processor core;
   a store queue (STQ) coupled to and receiving input from the processor core and providing output to at least one component within the memory hierarchy;
   logic associated with the STQ, which logic performs the functions of:
      receiving a non-synchronized store into a store queue (STQ);

in response to receiving the non-synchronized store in the STQ, setting or clearing one or more flags;

in response to receiving the non-synchronized store in the STQ, dynamically designating using the flags the non-synchronized store to retire in-order if an older synchronized store is already present in the STQ and, if an older synchronized store is not already presented in the STQ, dynamically designating using the flags the non-synchronized store to retire out-of-order; and retiring the non-synchronized store in accordance with its dynamically designated retirement ordering, said retiring including retiring the non-synchronized store in-order after the synchronized store retires if the non-synchronized store is designated to retire in-order and otherwise retiring the non-synchronized store without enforcing in-order retirement.

13. The data processing system of claim 12, wherein said logic retires the non-synchronized store out-of-order if the non-synchronized store is designated to retire out-of-order.

14. The data processing system of claim 12, wherein the logic, if at least one synchronized store is present in the STQ that is younger than the non-synchronized store, permits retirement of the non-synchronized store out-of-order and enforces retirement of the non-synchronized store before the at least one synchronized store retires.

15. The data processing system of claim 12, wherein the logic determines whether the non-synchronized store targets an address that is targeted by a preceding non-synchronized store present within the STQ, and if so, dynamically designates the non-synchronized store to retire in-order.

16. The data processing system of claim 12, wherein if an older thread-synchronized store is already present in the STQ when the non-synchronized store is received at the STQ, the logic retires the thread-synchronized store in-order, prior to the retirement of the non-synchronized store.

17. The data processing system of claim 12, wherein if an all-thread synchronized store is present in STQ when the non-synchronized store is received at the STQ, the logic permits retirement of non-synchronized stores older than the all-thread synchronized store out-of-order and enforces in-order retirement of synchronized stores older than the all-thread synchronized store.

* * * * *